(12) United States Patent
Kaneda et al.

(10) Patent No.: US 7,310,614 B2
(45) Date of Patent: Dec. 18, 2007

(54) SYSTEM AND METHOD FOR OPERATION AND MANAGEMENT OF STORAGE APPARATUS

(75) Inventors: Yasunori Kaneda, Sagamihara (JP); Shihoko Sekiguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 743 days.

(21) Appl. No.: 10/073,007

(22) Filed: Feb. 12, 2002

(65) Prior Publication Data
US 2003/0101109 A1    May 29, 2003

(30) Foreign Application Priority Data
Nov. 28, 2001 (JP) .............................. 2001-361908

(51) Int. Cl.
*G06Q 10/00* (2006.01)
(52) U.S. Cl. .......................................... 705/28; 710/74
(58) Field of Classification Search ................ 705/26, 705/28, 30; 711/170, 115, 149, 5; 710/74, 710/65, 21, 4; 709/321, 323, 203, 213, 4
See application file for complete search history.

(56) References Cited

U.S. PATENT DOCUMENTS

| | | | |
|---|---|---|---|
| 6,748,502 B2* | 6/2004 | Watanabe et al. ........... | 711/158 |
| 6,895,483 B2* | 5/2005 | Eguchi et al. ............... | 711/165 |
| 6,920,153 B2* | 7/2005 | Ellis et al. ................... | 370/475 |
| 6,976,103 B1 | 12/2005 | Watanabe et al. | |
| 7,096,269 B2* | 8/2006 | Yamagami .................. | 709/229 |
| 2002/0138691 A1* | 9/2002 | Yamamoto et al. ......... | 711/112 |
| 2003/0126394 A1* | 7/2003 | Fowler ....................... | 711/170 |

FOREIGN PATENT DOCUMENTS

JP       2001249853       9/2001

OTHER PUBLICATIONS

Fred Moore. First ISP, Then ASP Now SSP!. May 2000. Computer Technology Review.*
Brad O'Neill. What to expect from SSPs. Aug. 2000. Unisys World.*
"Service Business Supporting SSP", the Japanese periodical "Nikkei System Provider", pp. 50-57, Mar. 16, 2001.

* cited by examiner

*Primary Examiner*—Ronald Laneau
(74) *Attorney, Agent, or Firm*—Mattingly, Stanger, Malur & Brundidge, P.C.

(57) ABSTRACT

In order to readily switch over between SSPs (i.e., Storage Service Providers) that undertake the operation/management of storage apparatuses, in an information processing system including a computer and the storage apparatuses, an operating/managing system provided among the computer and the storage apparatuses includes the following units: A connection destination switching unit and an information duplicating unit for implementing the migration between the SSPs without interrupting the accesses to the storage apparatuses from the computer, and a request property selecting unit, a property comparing unit, and a comparison result indicating unit for assisting the selection of a purpose-fitting SSP from among the plurality of SSPs.

3 Claims, 14 Drawing Sheets

FIG.5

| | SSP NAME | VALID BIT | IP ADDRESS | VOLUME NUMBER |
|---|---|---|---|---|
| IN-USE STORAGE APPARATUS | | | | |
| | | | | |
| | | ⋮ | ⋮ | ⋮ |
| | | | | |
| MIGRATION DESTINATION STORAGE APPARATUS | | | | |
| | | | | |
| | | ⋮ | ⋮ | ⋮ |
| | | | | |

58

SYSTEM AND METHOD FOR OPERATION AND MANAGEMENT OF STORAGE APPARATUS

BACKGROUND OF THE INVENTION

1. Field of the Invention

The present invention relates to a method of utilizing a storage apparatus in an information processing system. In particular, it relates to a method of utilizing a storage apparatus and its storage areas in the case where the operation and the management of the storage apparatus are outsourced. More specifically, it relates to a method of selecting the storage areas and a method of migrating data held within the storage areas.

2. Description of the Related Art

In general, the storage apparatus is used with a computer system, thereby holding data and programs. In accordance with a request from the computer system, the storage apparatus is capable of writing-in, modifying, or reading-out the data and the programs.

The prevalence of computers and the Internet is now increasing electronic information explosively. In accompaniment therewith, the storage apparatus itself also continues to be increased in capacity. As a result, a company that owns a computer system must add-on and manage the storage apparatus in agreement with the information that continues to be increased. The operating/managing cost of the storage apparatus in a company is basically classified into the introduction cost of the storage apparatus and the management cost thereof. Concerning the capacity of the storage apparatus, however, as the capacity is made larger, the system becomes more complicated and thus the cost needed for the operation/management is increased further. On account of this condition, there exist some of the companies that make a plan to outsource the operation/management of the storage apparatus to the experts in order to reduce the operating/managing cost.

Meanwhile, in recent years, SSPs (: Storage Service Providers) that undertake the operation/management of the storage apparatus at a company's request have been getting started up. A company, i.e., a SSP's customer, requests the SSP to rent out a portion of storage area (i.e., a volume) of the storage apparatus, then outsourcing the operation/management of the volume to the SSP. This outsourcing makes it possible to reduce the operating/managing cost needed for the storage apparatus ("Service Business Supporting SSP", the Japanese periodical "Nikkei System Provider" pp50–57, Mar. 16, 2001).

As the number of the SSPs increases, a company finds it impossible to readily judge which SSP gives the company good receive the service. Also, once the company made a contract with a certain SSP and started the operation, a large amount of data has been accumulated therein. Accordingly, even if a more charming (e.g., a lower-price, a higher-performance, a higher-reliability, or the like) SSP appears, the company finds it impossible to easily switch over to the more charming SSP.

SUMMARY OF THE INVENTION

It is an object of the present invention to provide an operating/managing system by which, when a more charming SSP exists than an SSP that a user uses at present in a state where a large number of SSPs have offered services, there is performed a data migration for mediating between the more charming SSP and the user that is using the SSP and for allowing the user to switch over to the more charming SSP. The utilization of the operating/managing system according to the present invention makes it unnecessary to interrupt the accesses to the SSPs even during the offering of the data migration service.

In order to accomplish the above-described object of the present invention, in an information processing system including a computer and storage apparatuses, the operating/managing system of the storage apparatuses is provided among the computer and the storage apparatuses. The present operating/managing system includes a computer connecting unit for establishing the connection with the computer, two or more storage apparatus connecting units for establishing the connections with the plurality of storage apparatuses, a property holding unit for holding the properties (i.e., information on the performance, the price, the reliability, and the like) of the connected storage apparatuses, and a storage apparatus information holding unit for holding information on a storage apparatus in use at present and a storage apparatus of the migration destination.

Moreover, the present operating/managing system includes a connection destination switching unit for distributing information into the storage apparatus connecting units in a state where the destination address of the information has been switched in accordance with the information held in the storage apparatus information holding unit, the information being received at the computer connecting unit, and an information duplicating unit for controlling the reading-out of information from the storage apparatus and the writing-in of the information into the storage apparatus on the basis of the information held in the storage apparatus information holding unit. The use of the connection destination switching unit and the information duplicating unit allows the present operating/managing system to migrate the information without suspending the accesses to the storage apparatuses from the computer.

Furthermore, the present operating/managing system includes a volume requesting unit for requesting the allocation of a volume to the storage apparatus connected to the storage apparatus connecting units, and the storage apparatus connected to the storage apparatus connecting units includes a volume allocating unit. This permits the volumes to be allocated as required between the present operating/managing system and the storage apparatuses.

Also, the storage apparatus connected to the storage apparatus connecting units in the present operating/managing system may include a property inputting unit for inputting the property information into the storage apparatus property holding unit.

Also, the present operating/managing system may further include a request property holding unit for holding the properties of a storage apparatus required by the computer, a property comparing unit for making a comparison between the information held in the storage apparatus property holding unit and the information held in the request property holding unit, and a comparison result indicating unit for indicating the comparison results.

Also, the information duplicating unit in the present operating/managing system may include an information amount counting unit for counting the information amount duplicated by the information duplicating unit and an information amount indicating unit for indicating the counted result. In addition, the information amount indicating unit may include a price inputting unit for inputting the price needed for a duplication per unit information amount, and a price converting unit for indicating the duplicated information amount in such a manner as to be converted into a cost that has been needed for the duplication.

Other objects, features and advantages of the invention will become apparent from the following description of the embodiments of the invention taken in conjunction with the accompanying drawings.

BRIEF DESCRIPTION OF THE DRAWINGS

FIG. 5 illustrates a table in a storage apparatus information holding unit;

DESCRIPTION OF THE EMBODIMENTS

Figure 1:
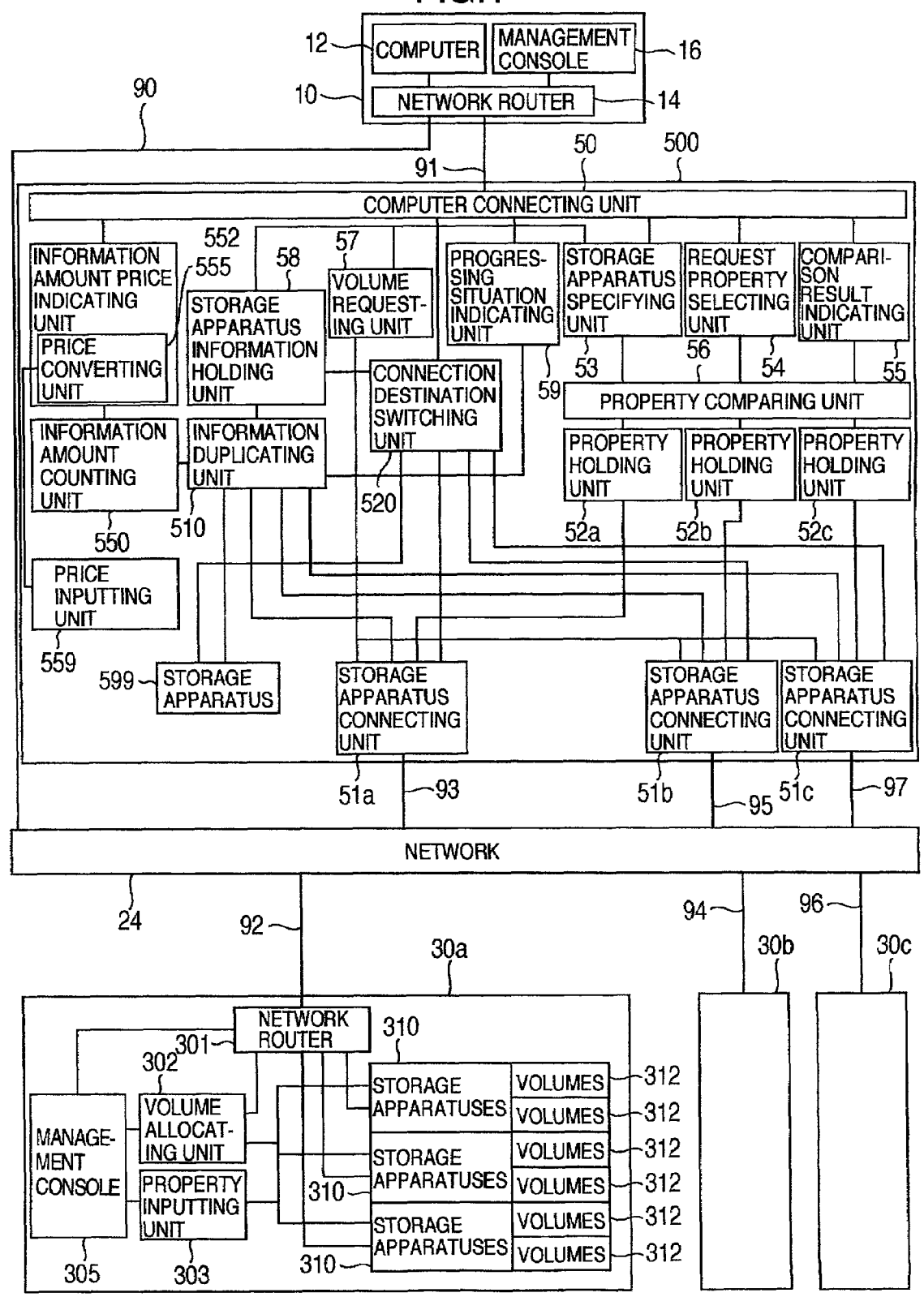
FIG. 1 illustrates the configuration of the operating/managing system according to the present invention.

Hereinafter, referring to the drawings, the explanation will be given below concerning an embodiment of the present invention.

(1) System Configuration

FIG. 1 illustrates the configuration of the present embodiment. In the embodiment in FIG. 1, three SSPs (: Storage Service Providers) 30a to 30c are connected to a network 24. Also, a computer 12 and a management console 16 in a client-side computer system 10 that utilizes the SSPs are also connected to the network 24 via a network router 14 and a path 90. Although, in the present embodiment, the network 24 has been assumed to be the IP (i.e., Internet Protocol) network, the unit of implementing the network does not limit the present embodiment.

Also, in the present embodiment, the three SSPs 30a to 30c will be explained, assuming that the three SSPs have one and the same configuration. Actually, among the three SSPs, storage apparatuses 310 differ in their numbers, their configurations, and their connections inside. The differences, however, exert no influences on the carrying-out of the present invention. The respective SSPs 30 include the plurality of storage apparatuses 310, and each storage apparatus 310 includes therein a plurality of volumes 312, respectively. In addition, the storage apparatuses 310 are connected to the network 24 via a network router 301. The respective SSPs 30, using a managing console 305, manage the storage apparatuses 310 in the respective SSPs, the volumes 312 in the storage apparatuses, and the network router 301.

The computer 12 in the client-side computer system 10 that utilizes the SSPs uses the volumes 312 in the storage apparatuses 310 in the SSPs 30, then outsourcing the operation/management of the storage apparatuses 310 to the SSPs 30. This outsourcing makes it possible to reduce the TCO(: Total Cost of Ownership) needed for the operation/management of the storage apparatuses. The respective SSPs rent out the volumes 312 in the storage apparatuses 310 and undertake the operation/management of the volumes, thereby obtaining an income from the client.

(2) Packet

Figure 2:
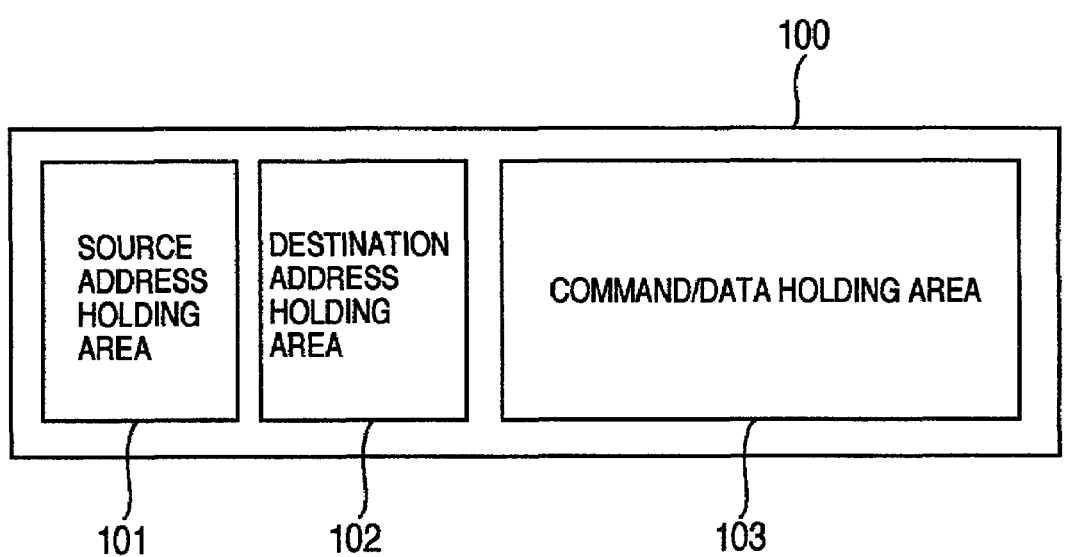
FIG. 2 illustrates a packet.

The transmission of a read/write request and data between the computer 12 and the storage apparatuses 310, the transmission of the management information between the management consoles 16, 305 and an operating/managing system 500, and the like are performed via the network router 14, the network 24, and the network router 301. In the IP network, the transmission of a request, data and information among the apparatuses are performed in a data unit referred to as "a packet". FIG. 2 illustrates the configuration of the packet 100. The packet includes at least the following three information-storing areas: A source address holding area 101, a destination address holding area 102, and a command/data holding area 103.

In the present embodiment, the IP network has been utilized as the network. Accordingly, based on an address stored in the destination address holding area 102 in the packet 100, the packet 100 is transferred to an apparatus having the matching address (the network routers play the role of this packet transfer). Consequently, each apparatus becoming the source apparatus or the destination apparatus must have its own specific address. In the case of the system configuration in FIG. 1, the computer 12, the storage apparatuses 310, the managing consoles 16 and 305, the computer connecting unit 50, the storage apparatus connecting units 51, and so on have their own specific address each. This address is referred to as "an IP address".

(3) Network Routers and Network

Figure 3:
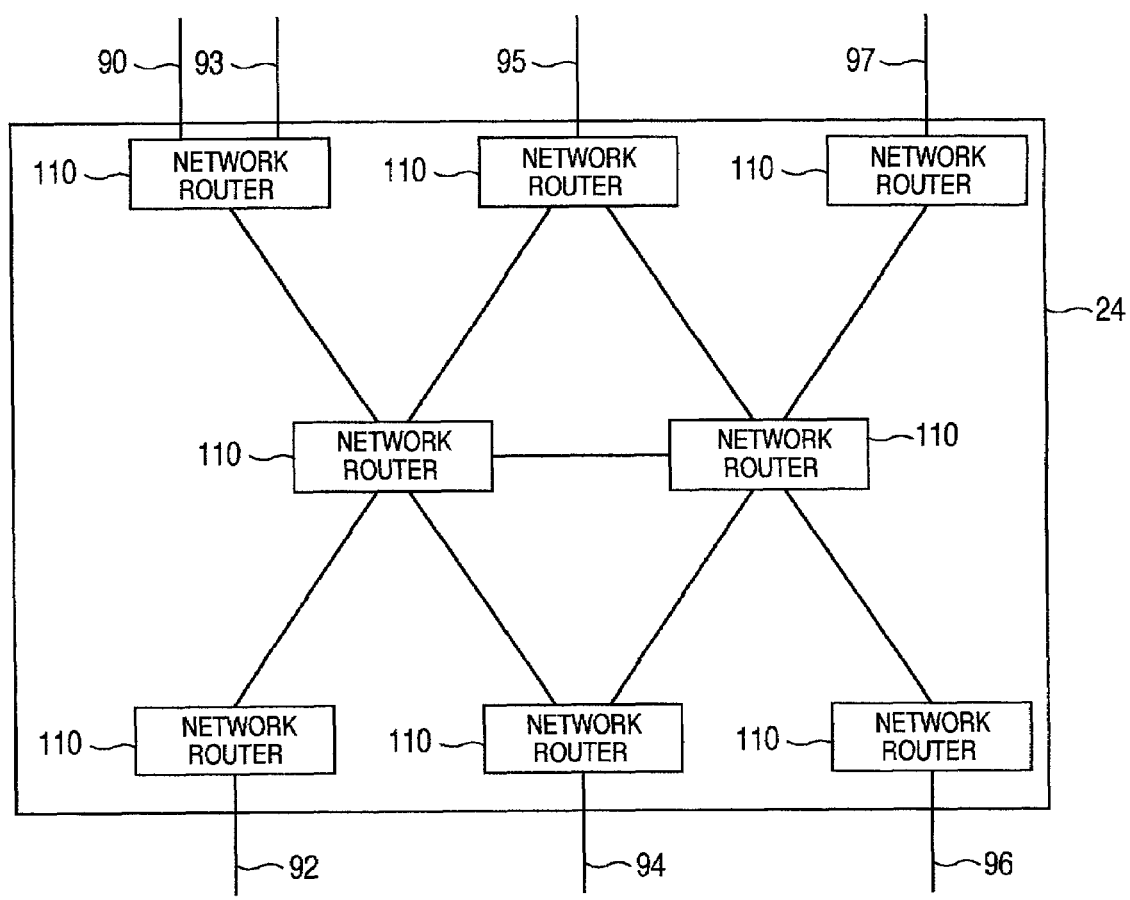
FIG. 3 illustrates a network (e.g., the IP network)

FIG. 3 illustrates an example of the configuration of the network 24. The network is a formed of a plurality of mutually interconnected network routers. When a network router 110 receives a packet, the network router fetches the destination address from the destination address holding area in the packet, then judging to which network router (or apparatus) the network router should transfer the packet next. For this purpose, the network router has a table referred to as "a routing table" and, based on this routing table, the network router judges the next transfer destination of the packet.

(4) Initial Connection State and Necessity for Switching Over

Hereinafter, in the present embodiment, the explanation will be given, defining, as an initial state, a state where the computer system 10 utilizes one of the volumes 312 in the SSP 30a. Usually, the SSP 30a rents out the volumes to a plurality of clients. The network router 14 connected to the computer 12 selects the path 90 so as to establish the connection with the network 24. A read/write request from the computer 12 to the volume 312 in the storage apparatus 310 is transmitted to the storage apparatus 310 via the network router 14, the network 24, and the network router 301. When one storage apparatus has the plurality of volumes, the computer specifies the volume number of a particular volume, thereby accessing the particular volume.

If the client that owns the computer system 10 utilizing the SSP 30a has no complaints about the service offered by the SSP 30a, the client need not switch over from the SSP 30a to another SSP. Accordingly, there is no problem in continuing the outsourced operation of the storage apparatus with the above-described initial state left unchanged.

If, however, a more charming (e.g., a lower-price, a higher performance, a higher-reliability, or the like) SSP exists, there is a necessity for considering the switching over between the SSPs. Also, when performing the switching over, the data held in the SSP 30a at present needs to be migrated to the switching destination SSP. Hereinafter, in the present embodiment, the explanation will be given below concerning a method and a unit for selecting an aimed-at SSP from among the plurality of SSPs and a method for migrating the data after the determination of the switching destination SSP with the use of the operating/managing system 500 according to the present invention.

(5) Selection of SSPs

In the case of the system configuration in FIG. 1, the three SSPs 30a to 30c are registered in and are connected to the operating/managing system 500 according to the present invention. The operating/managing system 500 includes property holding units 52 (in the case of the present embodiment, three property holding units 52a to 52c) for holding the properties of the respective SSPs.

Figure 10:
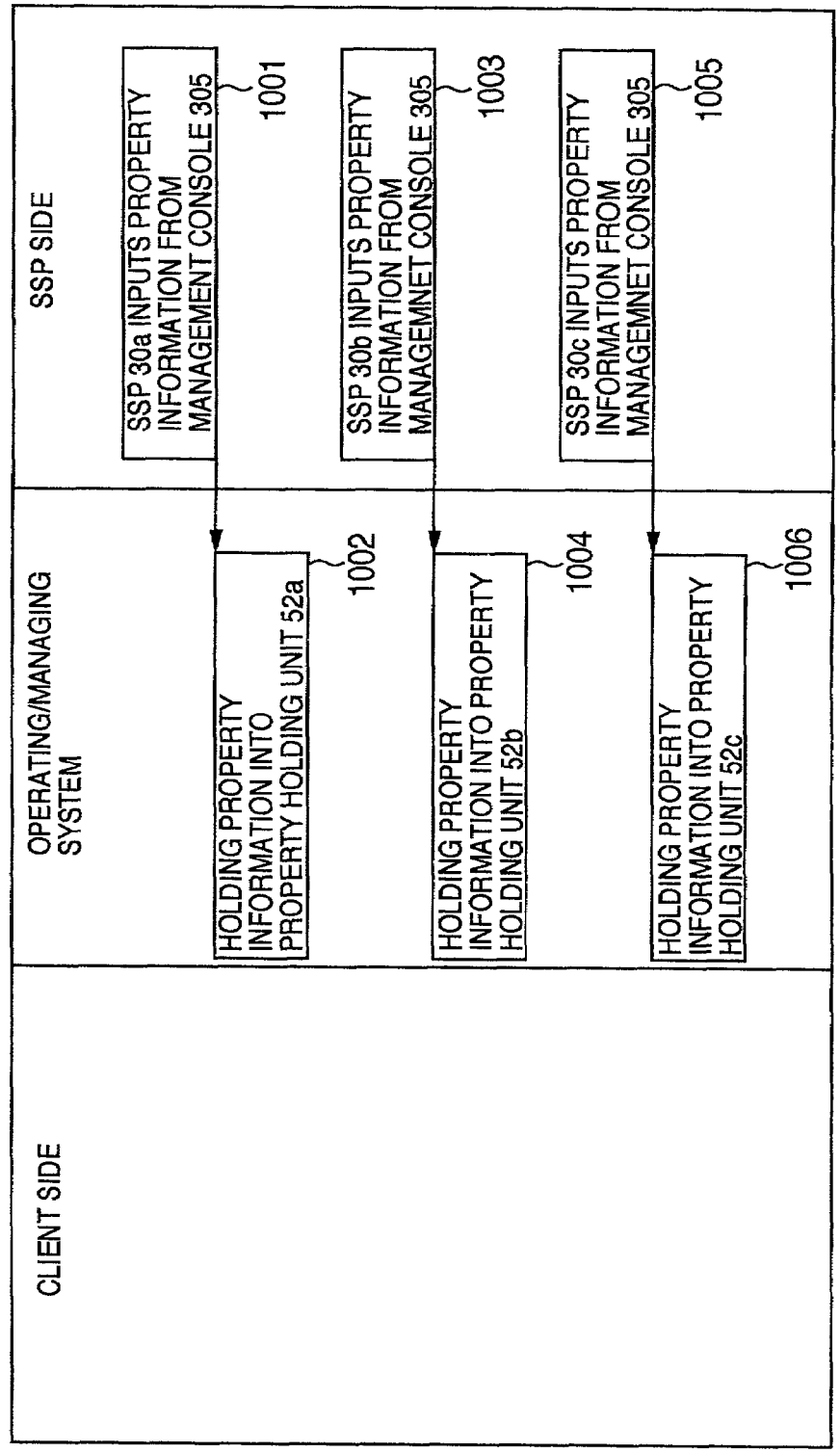
FIG. 10 is a flowchart for explaining the property information setting from SSPs.

FIG. 10 is a flowchart for explaining the property information setting from the SSPs.

Using a property inputting unit 303, the respective SSPs transmit the property information to the operating/managing system 500 from the managing console 305 (steps 1001, 1003, and 1005). The operating/managing system 500 stores the received property information into the property holding units 52 corresponding to the respective SSPs (steps 1002, 1004, and 1006). The property information inputted by the property inputting unit 303 are registered into the property holding units 52 via the network router 301, the network 24, and storage apparatus connecting units 51. The exchanges of the property information between the property inputting unit 303 and the property holding units 52 are also performed using the packets.

The properties of each SSP are information on the performance, the price, the reliability, and the like. The performance is indicated by the per-second receivable access number, the transfer rate, and the average response time. The price is indicated by the per-unit-capacity cost. The reliability is indicated by the RAID level, the mirror configuration with a remote site, and the back-up interval.

Figure 4:
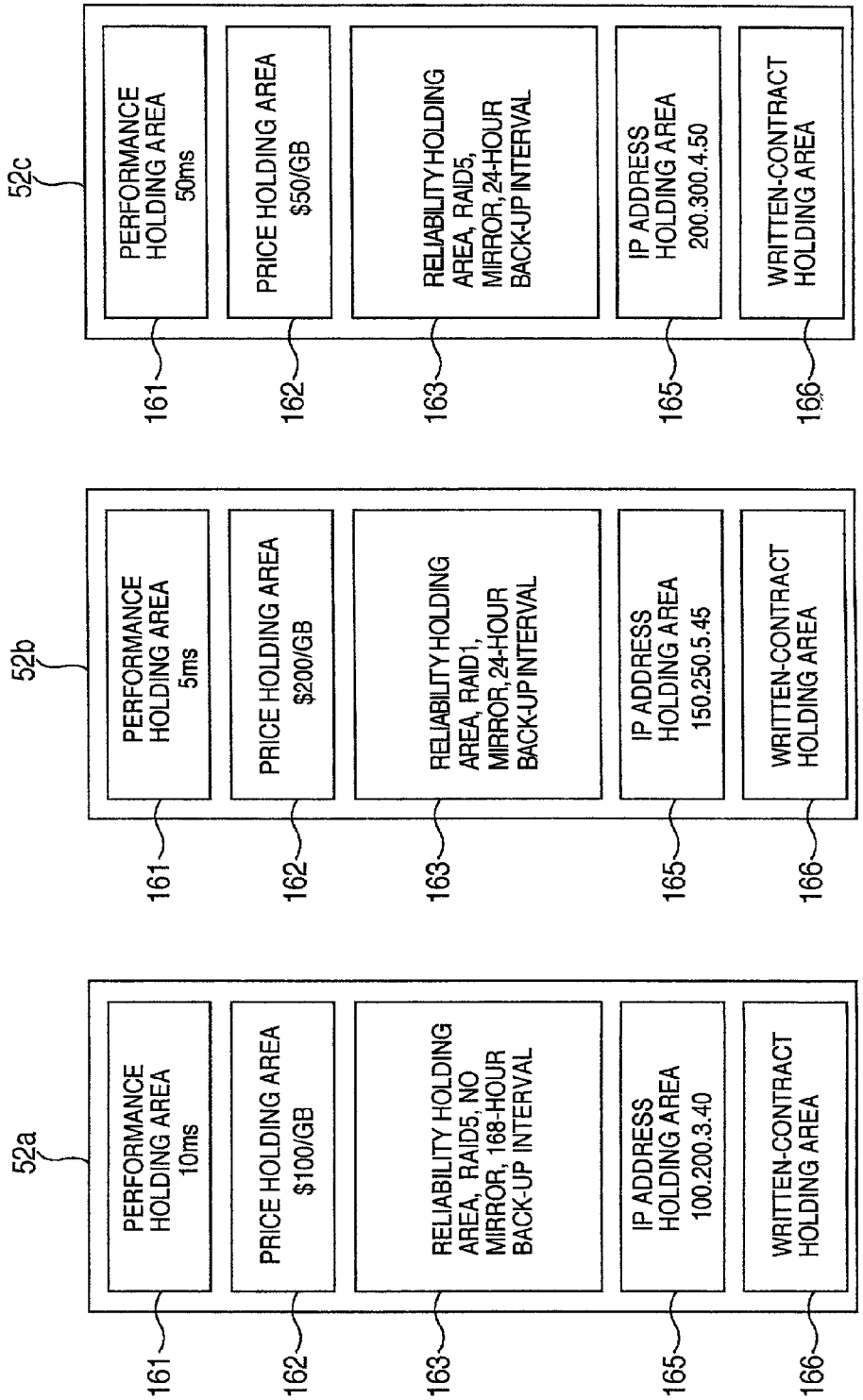
FIG. 4 illustrates the contents of property holding units.

In the present embodiment, the property holding units 52a to 52c corresponding to the respective SSPs include areas illustrated in FIG. 4, respectively, thus holding the property information. In the case of FIG. 4, each property holding unit includes the following three holding areas: A performance holding area 161 (the average response time), a price holding area 162 (the per-giga-byte cost), and a reliability holding area 163 (the RAID level, the presence or absence of the mirror with a remote site, and the back-up interval). Also, in FIG. 4, each property holding unit further includes an IP address holding area 165 that holds an IP address for accessing each SSP, and a written-contract holding area 166 for holding all the sentences of a written-contract required for a contract made with the client. At the time of the inputting of the property information from each SSP, a representative IP address becoming the first contact point of each SSP is also inputted. The representative IP address inputted here is utilized when a volume area creating request or the like is issued from the operating/managing system 500 to each SSP.

In the present embodiment, the explanation will be given below, assuming that the respective three SSPs have the following properties (FIG. 4): The properties of the SSP 30a in use at present are 10 ms average response time, $100/GB, RAID5, no mirror with a remote site, and 168-hour back-up interval (once a week). The properties of the SSP 30b are 5 ms average response time, $200/GB, RAID1, mirror with a remote site: present, and 24-hour back-up interval (once a day). The properties of the SSP 30c are 50 ms average response time, $50/GB, RAID5, mirror with a remote site, and 24-hour back-up interval (once a day).

A client that is considering the switching over between SSPs registers an SSP that the client uses at present, using a storage apparatus specifying unit 53 from the managing console 16 via the network router 14 and the computer connecting unit 50. In the initial state of the present embodiment, since the computer system 10 has utilized the SSP 30a, the client registers the SSP 30a. The SSP in use at present, which has been set by the storage apparatus specifying unit 53, is held into a storage apparatus information holding unit 58.

The storage apparatus information holding unit 58 holds a table illustrated in FIG. 5. The table includes, concerning storage apparatuses 581, 582 in the SSPs, an IP address holding area, a volume number holding area, an SSP name holding area, and a valid bit holding area for indicating whether or not the information are valid. The valid bit holding area, the IP address holding area, and the volume number holding area are configured so that a plural pieces of information can be held.

(6) Screen for Registration

Figure 6:
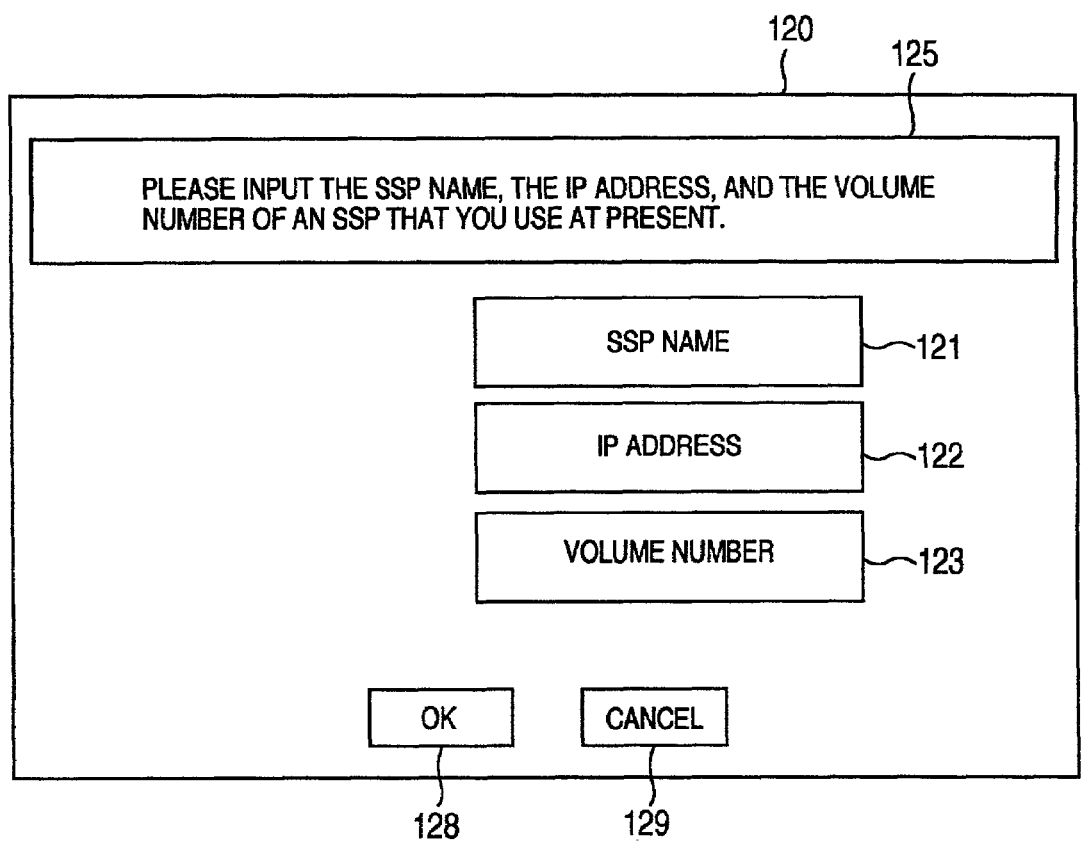
FIG. 6 illustrates a window image by a storage apparatus inputting unit.

FIG. 6 illustrates a screen image used in the storage apparatus specifying unit 53. A window screen 120 illustrated in FIG. 6 includes an explanation frame 125 for explaining the present window, an SSP name inputting frame 121 for inputting an SSP name in use at present, an IP address inputting frame 122 for inputting the IP address of a storage apparatus in use at present, and a volume number inputting frame 123 for inputting the volume number.

Figure 11:
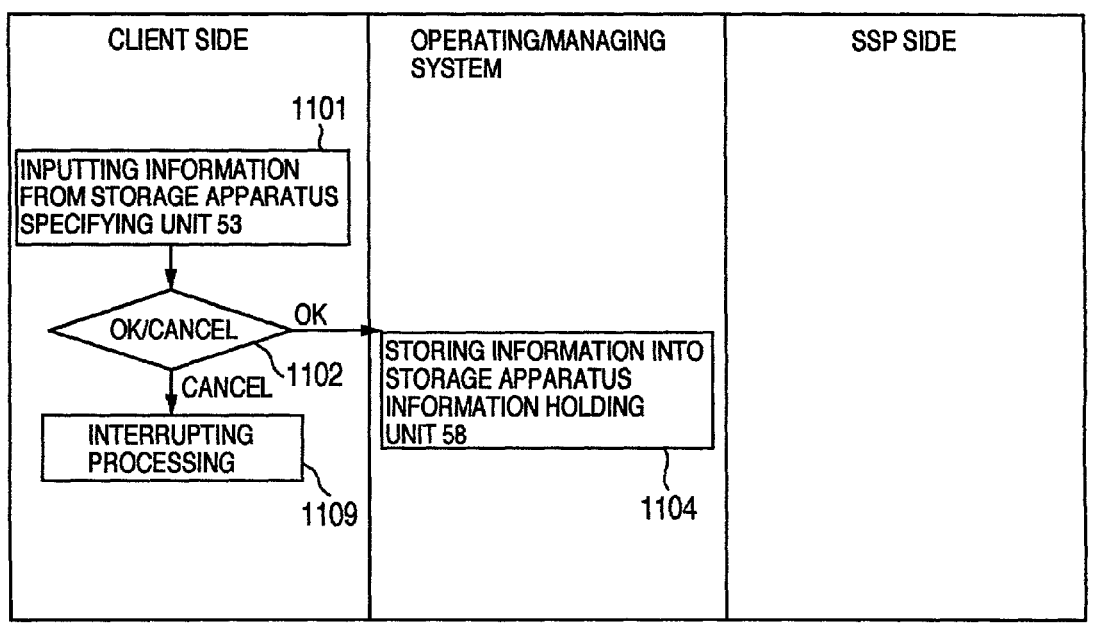
FIG. 11 is a flowchart concerning a processing for setting a storage apparatus that a client is using at present.

FIG. 11 illustrates a flowchart concerning a processing for setting information on the storage apparatus that the client uses at present. The information inputted via the inputting frames illustrated in FIG. 6 (a step 1101), if an "OK" button 128 is pushed (a step 1102), is held into the table of the storage apparatus information holding unit 58 illustrated in FIG. 5 (a step 1104). Pushing a "CANCEL" button (the step 1102) cancels the inputting processing (a step 1109).

Figure 12:
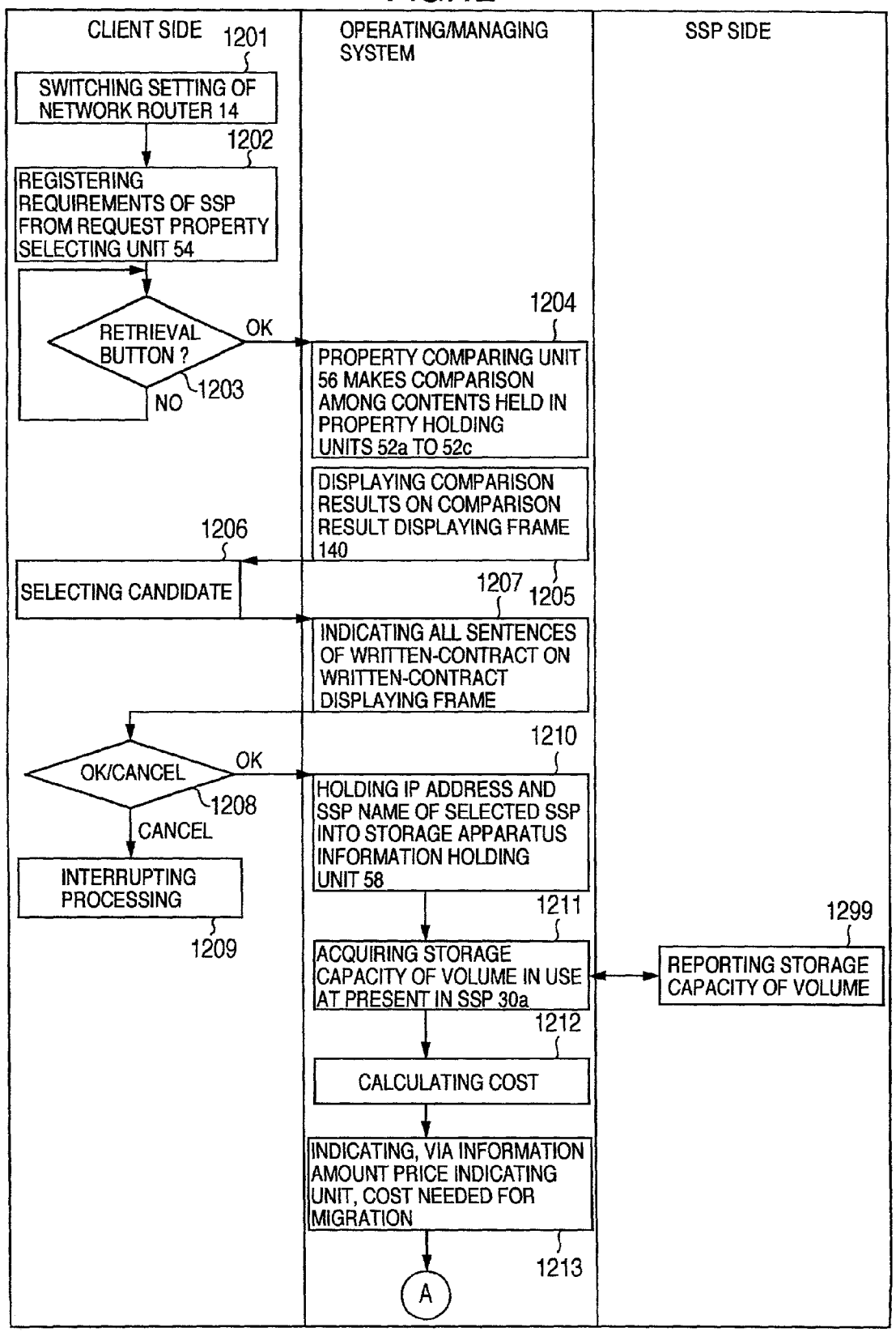
FIG. 12 is a (1st) flowchart regarding a processing for switching over between the SSPs.
Figure 13:
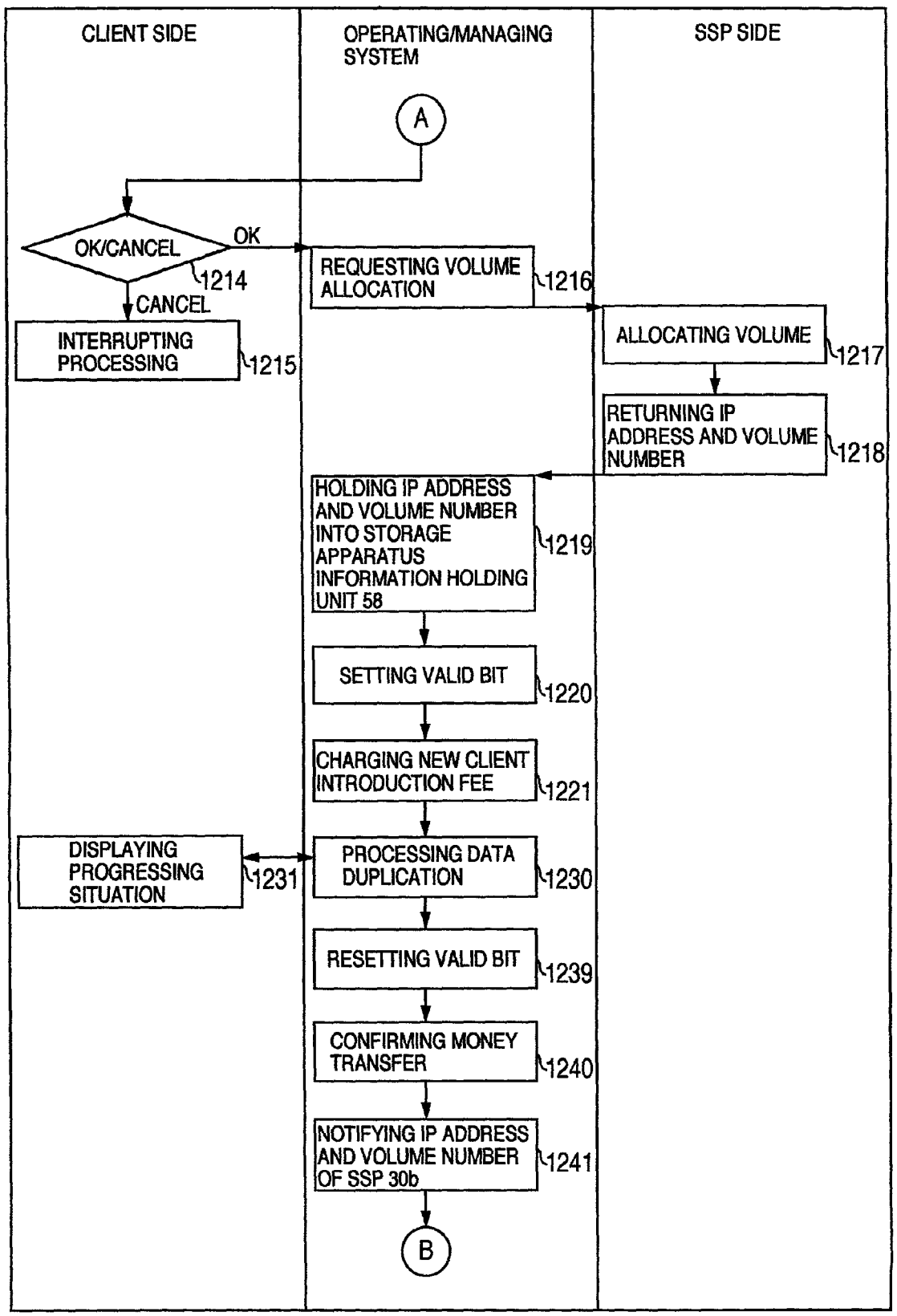
FIG. 13 is a (2nd) flowchart regarding a processing for switching over between the SSPs.
Figure 14:
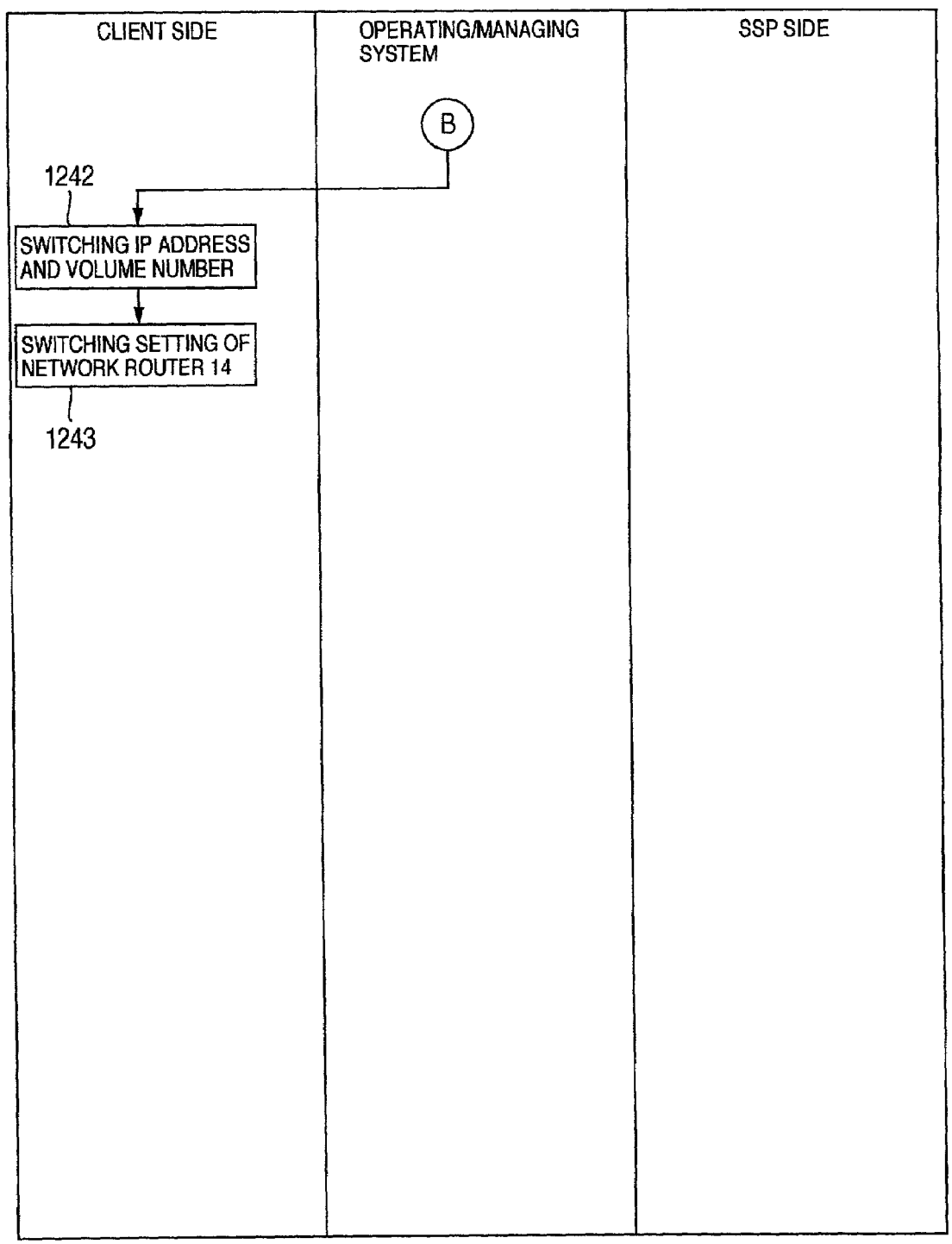
FIG. 14 is a (3rd) flowchart regarding a processing for switching over between the SSPs.

FIGS. 12, 13, and 14 illustrate flowcharts regarding the processings for switching over between the SSPs.

(7) Packet Processing by Network Router (a Step 1201 in FIG. 12)

A read/write request made by the computer 12 of the computer system 10 toward the storage apparatus 310 in the SSP 30a, in the initial state, is made by the network router 14 via the path 90.

In view of this situation, the client of the computer system 10 that is considering the switching over between the SSPs switches the setting of the network router 14 (the step 1201) so that the exchange of the packet with the storage apparatus 310 will be performed via a path 91. Then, the network router 14 selects the path 91, and accordingly the packet issued by the computer 12 toward the storage apparatus 310 in the SSP 30a is transferred to the computer connecting unit 50.

The operating/managing system 500 according to the present invention transfers, to the connection destination switching unit 520, the packet received by the computer connecting unit 50. The connection destination switching unit 520 substitutes the source address of the packet by the IP address of the storage apparatus connecting unit 51a. It is preferable to leave the destination address of the packet as it is, i.e., the IP address of the storage apparatus 310 in the SSP 30a. The substitution of the source address of the packet by the storage apparatus connecting unit 51a allows a response from the storage apparatus to be received at the operating/managing system 500. The connection destination switching unit 520 transfers, to the storage apparatus connecting unit 51a, the packet the source address of which has been replaced. The storage apparatus connecting unit 51a issues the packet to the network 24. Since, in the packet, the IP address of the storage apparatus 310 in the SSP 30a has been held as the destination address, the packet is delivered without fail to the target storage apparatus 310 in the SSP 30a via the network router 301.

The response from the storage apparatus 310 is performed in accordance with the source address that the connection destination switching unit 520 has intentionally replaced by the storage apparatus connecting unit 51a, and consequently the response packet is delivered to the storage apparatus connecting unit 51a. Having received the response packet, the storage apparatus connecting unit 51a transfers the response packet to the connection destination switching unit 520. The connection destination switching unit 520 intentionally replaces the destination address by the IP address of the computer 12. Furthermore, the response packet replaced by the IP address is transferred to the computer connecting unit 50. This permits the response packet from the storage apparatus 310 to be delivered without fail to the computer 12 via the network router 14.

The setting described above switches the setting of the network router 14, thereby making it possible to access the SSP 30a by way of the operating/managing system 500 according to the present invention. In this way, using the storage apparatus specifying unit 53, the SSP in use at present (in the case of the present embodiment, the SSP 30a) is set in advance. This setting allows the implementation of the switching to the path by way of the operating/managing system 500 without interrupting the processing at the computer 12. Also, after the switching, this setting makes it possible to continue the operation with the SSP 30a.

(8) Inputting of Request Properties and Indication of Candidates (a Step 1202 in FIG. 12)

Next, using a request property selecting unit 54 from the managing console 16 via the network router 14 and the computer connecting unit 50, the client of the computer system 10 that is considering the switching over between the SSPs registers what SSP the client needs (the step 1202). In the case of the present embodiment, there are provided the following three alternatives: The three alternatives are three items of "lowerprice", "higher-performance", and "higher-reliability".

In the case of selecting the alternative of "lower-price", a property comparing unit 56 makes a comparison between the property information held in the property holding unit 52a of the SSP 30a in use at present and the property information held in the other property holding units 52b and 52c, thereby indicating, as a candidate, the SSP 30c of the lower price via a comparison result indicating unit 55. In this case, the property comparing unit indicates, via the comparison result indicating unit 55, the condition that the cost becomes cheaper but the performance (i.e., the response time) is lowered from 10 ms down to 50 ms.

In the case of selecting the alternative of "higher-performance", the property comparing unit 56 makes the comparison in much the same way, thereby indicating, as a candidate, the SSP 30b of the higher performance. In this case, the unit indicates, via the comparison result indicating unit 55, the condition that the performance is enhanced but the cost becomes higher from $100/GB up to $200/GB.

In the case of selecting the alternative of "higher-reliability", the property comparing unit 56 makes the comparison in much the same way, thereby indicating, as candidates, the SSPs 30b and 30c of a higher reliability (i.e., the mirror with a remote site is present, and the 24-hour back-up interval). In this case, the property comparing unit 56 estimates the RAID level 1 and the RAID level 5 as the equal reliability (the RAID 1 results from the data protection by the mirror configuration, and the RAID 5 results from the data protection by the parity). Of course, the property comparing unit indicates, via the comparison result indicating unit 55, the condition that, in the case of selecting the SSP 30b, the performance is enhanced but the cost also becomes higher, and the condition that, in the case of selecting the SSP 30c, the performance is lowered by the amount equivalent to the cost made cheaper.

Based on the contents indicated by the comparison result indicating unit 55, the client that uses the SSP 30a at present can make a decision as to whether or not the client should switch over from the SSP 30a to another SSP.

(9) Screen for Selection and Decision of Switching Over (Steps 1203 to 1210 in FIG. 12)

Figure 7:
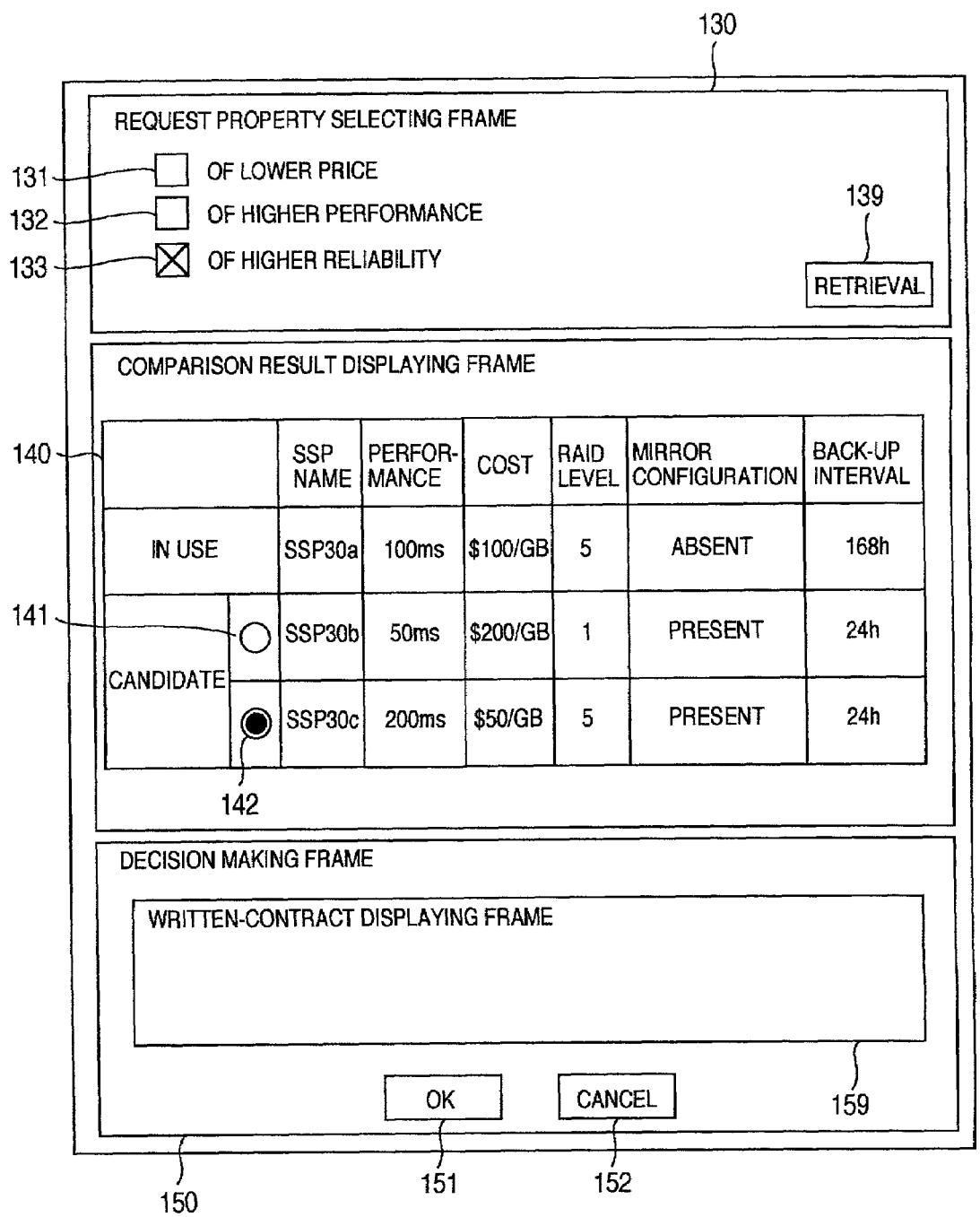
FIG. 7 illustrates a window image by a request property selecting unit and a comparison result indicating unit.

FIG. 7 illustrates a screen image used in the request property selecting unit 54 and the comparison result indicating unit 55. Although a screen may be designed for each of the units independently, in the present embodiment, the one screen includes the two units. FIG. 7 illustrates the comparison results indicated in the case of selecting the alternative of "higher-reliability" in the above-described description. The window screen illustrated in FIG. 7 includes a request property selecting frame 130 for selecting the request properties, a comparison result displaying frame 140 for displaying the comparison results by the property comparing unit 56, and a decision making frame 150 for prompting a judgement of starting the migration between the SSPs.

The frame 130 includes three checking boxes 131 to 133 for selecting the request properties. The three checking boxes correspond to "lower-price", "higher performance", and "higher-reliability", respectively. It is also possible to select a plurality of checking boxes simultaneously. For example, when wising to suppress the cost and to enhance the performance, it is appropriate to check the checking boxes for the two items of "lower-price" and "higher performance". After having checked at least one of the three checking boxes 131 to 133, pushing a "retrieval" button (the step 1203) causes the property comparing unit 56 to make a comparison among the contents held in the property holding units 52a to 52c (the step 1204). Moreover, the property comparing unit displays the comparison results on the comparison result displaying frame 140 (the step 1205).

On the comparison result displaying frame 140, the SSP in use at present and the SSPs of the candidates therefor are indicated in a table format. The candidates are provided with radio buttons 141 and 142, and it is possible to select either of the candidates. If the candidate 30*b* is selected (the step 1206), all the sentences of a written-contract with the selected candidate 30*b* are indicated on a written-contract displaying frame 159 provided in the frame 150 (the step 1207). All the sentences of the written-contract have been held in the written-contract holding area 166 in the property holding unit 52*b*. If all the sentences are not involved in the frame, scrolling the written-contract makes it possible to display all the sentences.

Next, if an "OK" button 151 is selected (the step 1208), judging that the contract with the SSP 30*b* has been completed, a data migration processing from the SSP 30*a* to the newly selected SSP 30*b* is started. Here, pushing a "CANCEL" button 152 interrupts the processing at this point-in-time (the step 1209). When the "OK" button is pushed, the storage apparatus specifying unit 53 holds, into the migration destination storage apparatus 582 in the storage apparatus information holding unit 58 in FIG. 5, the representative IP address and the SSP name of the SSP selected as the migration destination (the step 1210).

At this point-in-time, however, the volume number has been not determined yet. Accordingly, the volume number column is set to be a blank. The valid bits are not set. In FIG. 7, although SSP 30*a* and SSP 30*b* have been used as the SSP names, it is also possible to use some designations that are easier to understand concretely than the company names or the like.

Next, assuming that, on the window illustrated in FIG. 7, the SSP 30*b* has been selected as the SSP of the migration destination, the explanation will be given regarding the data migration processing.

(10) Indication of Price (Steps 1211 to 1213 and 1299 in FIG. 12)

On the window illustrated in FIG. 7, if the SSP 30*b* is selected as the SSP of the migration destination and the "OK" button 151 is pushed, an information amount counting unit 550 acquires, via an information duplicating unit 510, the storage capacity of the volume 312 in the SSP 30*a* in use at present (the steps 1211, 1299).

Usually, the volume 312 is managed as a group of blocks having addresses referred as to "LBA (: Logical Block Address)". The final LBA of the volume is multiplied by the per-block byte number (usually, in many cases, the n-th power of 2, e.g., 512 bytes), thereby being capable of determining the data amount to be migrated. The information amount counting unit 550, based on the storage capacity of the volume 312 in the SSP 30*a*, calculates the cost needed for the data migration toward the client of the computer system 10 (the step 1212), then, via an information amount price indicating unit 552, indicating the cost needed for the data migration (the step 1213).

Figure 8:
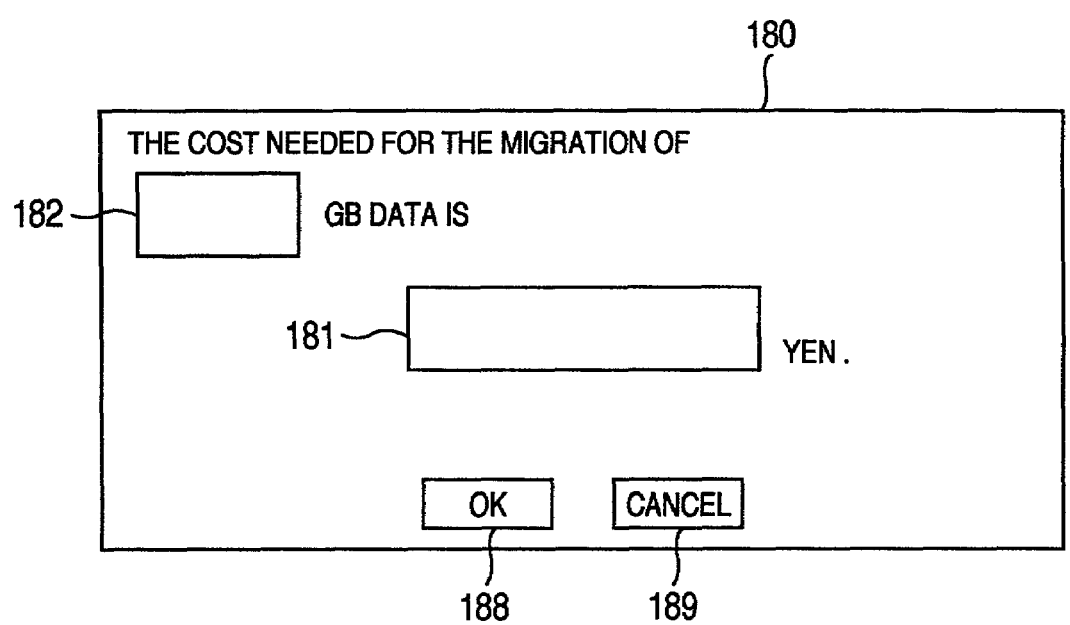
FIG. 8 illustrates a window image by a price indicating unit.

FIG. 8 illustrates a window image used in the information amount price indicating unit 552. The storage capacity of the volume that the information amount counting unit 550 has acquired is converted into price information (i.e., the cost) by a price converting unit 555. In addition, the information amount price indicating unit 552 indicates the price toward the client via a price indicating frame 181. The data on which this conversion is based (e.g., the per-capacity cost) can be inputted from a price inputting unit 559. As illustrated in FIG. 8, in addition to the indication of the price, it is also allowable to indicate, via a data amount indicating frame 182, the total data amount to be migrated. The fee indicated here must be paid from the client that uses the computer system 10 to the company that operates the present operating/managing system.

(11) Preparation for Migration Starting (i.e., Creation of Volume) (Steps 1214 to 1221 in FIG. 13)

If, on a window illustrated in FIG. 8, an "OK" button 188 is pushed (the step 1214) and an approval for the cost needed for the migration is obtained, in order to migrate the data, the operating/managing system 500 at first creates a new volume in the SSP 30*b* selected as the migration destination. Here, pushing a "CANCEL" button 189 results in no data migration and interrupts the processing at this point-in-time (the step 1215).

Based on the representative IP address stored in the IP address holding area in the migration destination storage apparatus 582 of the storage apparatus information holding unit 58 illustrated in FIG. 5, a volume requesting unit 57 in the operating/managing system 500 requests a volume allocating unit 302 in the SSP 30*b* to allocate a volume (the step 1216). When the volume allocating processing is completed (the step 1217), the volume allocating unit 302 returns the IP address and the volume number of an allocated storage apparatus back to the volume requesting unit 57 (the step 1218). The volume requesting unit 57 stores the IP address and the volume number of the received storage apparatus into the storage apparatus information holding unit 58 (the step 1219), then setting the valid bit to be "1" (the step 1220).

The volume requesting unit 57 leaves, in a log inside, information that the new volume has been created in the SSP 30*b*. After all, it turns out that the operating/managing system 500 has introduced a new client to the SSP 30*b*. Consequently, in accordance with the information left in the log, the operating/managing system 500 charges the SSP 30*b* a new client introduction fee (the step 1221). The volume requesting unit 57 can perform the charging of this introduction fee electronically toward the managing console 305 in the SSP 30*b*, or can perform the charging in accordance with a non-electronic method such as a bill on the basis of the information in the log.

(12) Packet Processing During Migration Processing

When the valid bit of the migration destination storage apparatus 582 in FIG. 5 is set to be "1", thereinafter, the connection destination switching unit 520 creates one copy of a packet that the unit 520 has received from the computer connecting unit 50. As described earlier, the source address of the received original packet is intentionally replaced by the IP address of the storage apparatus connecting unit 51*a*, then transferring the original packet to the storage apparatus connecting unit 51*a*. Meanwhile, the source address of the copied packet is intentionally replaced by the IP address of the storage apparatus connecting unit 51*b*, and the destination address thereof is intentionally replaced by the IP address of the storage apparatus 310 in the SSP 30*b* (i.e., the IP address specified earlier by the volume allocating unit 302), then transferring the copied packet to the storage apparatus connecting unit 51*b*.

The above-described processing causes the original packet to be delivered to the SSP 30*a*, and causes the copied packet to be delivered to the SSP 30*b* of the migration destination. Responses to the respective packets are returned back from the respective storage apparatuses 310. The response packet from the SSP 30*a* is received by the storage apparatus connecting unit 51*a*. Then, the connection destination switching unit 520 substitutes the destination address of the response packet by the IP address of the computer 12, thereby returning the response packet back to the computer 12 without fail. The response packet from the SSP 30b of the migration destination is received by the storage apparatus connecting unit 51b, then being transferred to the connection destination switching unit 520. The connection destination switching unit 520 checks the received response packet, and if the destination address thereof is the storage apparatus connecting unit 51b, the unit 520 discards the response packet.

Creating the copy of the packet as described above allows a write data issued by the computer 12 to be written into the volumes in both of the SSP 30a and the SSP 30b. This permits the newest data to be always held in both of the SSP 30a and the SSP 30b. Also, read data is transmitted to the computer 12 only from the SSP 30a.

(13) Duplication of Data (Steps 1230, 1231, and 1239 in FIG. 13)

When the valid bit of the migration destination storage apparatus 582 in FIG. 5 is set to be "1", thereinafter, the information duplicating unit 510 starts the duplication of the data from the volume in the SSP 30a to the volume in the SSP 30b. The data from the head LBA to the final LBA of the volume in the SSP 30a are duplicated into the volume in the SSP 30b (the step 1230). The information duplicating unit 510 issues a read request to the volume in the SSP 30a so as to read out the data, then issuing a write request to the volume in the SSP 30b so as to write the read-out data therein. This processing is performed up to the final LBA while incrementing the LBA. During the duplication processing, the information duplicating unit 510 indicates the progressing situation of the copy toward the client by a progress indicating unit 59 (the step 1231). The employment of a bar graph or the like displays the progress such as the percentage of the copy.

When the information duplicating unit 510 completes the duplication up to the final LBA, perfectly the same data have been written into the volume in the SSP 30a and the volume in the SSP 30b. When the duplication is completed, the information duplicating unit 510 resets, to be "0", the valid bit of the in-use storage apparatus 581 in the storage apparatus information holding unit 58 in FIG. 5 (the step 1239).

(14) Packet Processing After Completion of Data Duplication

When the valid bit of the in-use storage apparatus 581 in the storage apparatus information holding unit 58 in FIG. 5 is reset to be "0", the connection destination switching unit 520, judging that the duplication has been completed, thereinafter switches the packet processing. Namely, although the unit 520 has been creating the copy of the packet during the duplication, it stops the packet duplication. Moreover, the source address of the packet received from the computer connecting unit 50 and the destination address thereof are intentionally replaced by the IP address of the storage apparatus connecting unit 51b and the IP address of the storage apparatus 310 in the SSP 30b, respectively, then issuing the packet to the storage apparatus connecting unit 51b. This causes the packet to be delivered only to the aimed-at volume in the SSP 30b of the migration destination.

The response from the storage apparatus 310 is performed in accordance with the source address that the connection destination switching unit 520 has intentionally replaced, and consequently the response packet is delivered to the storage apparatus connecting unit 51b. Having received the response packet, the storage apparatus connecting unit 51b transfers the response packet to the connection destination switching unit 520. The connection destination switching unit 520 intentionally replaces the destination address by the IP address of the computer 12. Furthermore, the response packet replaced by the IP address is transferred to the computer connecting unit 50. This permits the response packet from the storage apparatus 310 to be delivered without fail to the computer 12 via the network router 14.

(15) Setting Switching of Computer 12 and that of Network Router 14 (a Step 1240 in FIG. 13 to a Step 1243 in FIG. 14)

Finally, it is required to switch the setting of the computer 12 so that the issuing destination of the packet will be switched from the IP address and the volume number of the storage apparatus 310 in the SSP 30a to the IP address and the volume number of the storage apparatus 310 in the SSP 30b. In order to perform the switching, it is necessary to know the IP address and the volume number of the new SSP 30b of the migration destination. Having confirmed the fee payment from the client that owns the computer system 10 (the step 1240), the operating/managing system 500 notifies the computer system 10 of the IP address and the volume number of the SSP 30b (the step 1241).

In accordance with the IP address and the volume number notified, the operating/managing system 500 switches the issuing destination of the packet from the IP address and the volume number of the storage apparatus 310 in the SSP 30a to the IP address and the volume number of the storage apparatus 310 in the SSP 30b (the step 1242). Even if this switching has been performed, since the setting of the network router 14 has been not switched, the packet is delivered to the operating/managing system 500. Accordingly, if, in this state, the connection destination switching unit 520 receives the packet, there occurs no problem because the connection destination switching unit still continues the intentional replacement of the packet.

Next, the setting of the network router 14 is switched so that the packet will be sent to the network 24 with the use of the path 90 (the step 1243). This switching makes it possible to access the SSP 30b without the involvement of the operating/managing system 500.

A program for implementing the linkage with the operating/managing system 500 is prepared on the computer system 10. By doing this, the setting switching of the computer 12 and that of the network router 14 in the computer system 10 can also be performed from the operating/managing system 500.

(16) Utilization of Storage Apparatus Inside System

As illustrated in FIG. 1, a storage apparatus 599 provided inside the operating/managing system 500 may be used for migrating the data between the SSPs. In this case, for example, the data stored in the volume in the SSP 30a is duplicated into the storage apparatus 599 once. The packet processing during the duplication is basically the same as the processing described already. Next, in the case where the SSP of the migration destination is the SSP 30b, the data duplication is performed from the storage apparatus 599 to the SSP 30b. The packet processing during the duplication in this case is also basically the same as the processing described already. In the case where the migration between the SSPs cannot be performed immediately because of the circumstances on the contract time-periods with the SSP 30a and the SSP 30b, the use of the storage apparatus 599 provided inside the operating/managing system 500 also makes it possible to temporarily commission the operation/ management to the storage apparatus 599.

(17) Duplication of a Plurality of Volumes

The above-described explanation has been given concerning the case where the computer system 10 duplicates the one volume 312 in the SSP 30a into the one volume 312 in the SSP 30b. However, in the case where the computer system 10 has used the plurality of volumes 312 in the SSP, each of the plurality volumes needs to be duplicated. There exist two methods of duplicating the plurality volumes.

The first method is a method of duplicating the volumes one by one. For this purpose, as illustrated in FIG. 5, the table that the storage apparatus information holding unit 58 holds is configured so that a plurality of IP addresses and volume numbers can be held. Using this table, the SSP is switched in sequence from a volume the duplication of which has been finished. The second method is a method of using the plurality of information duplicating units 510. This method makes it possible to duplicate the plurality of volumes simultaneously.

(18) Support for a Plurality of Clients

Figure 9:
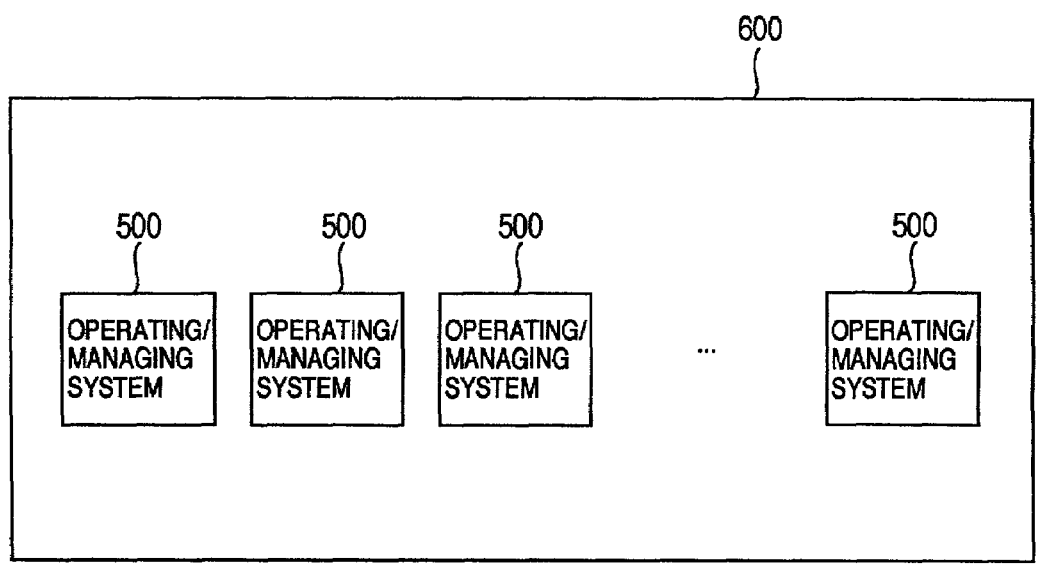
FIG. 9 illustrates the configuration of the operating/managing system in the case where the service is offered to a plurality of customers.

Also, as illustrated in FIG. 9, by preparing an operating/managing system 600 where the operating/managing systems 500 illustrated in FIG. 1 are provided in a plural number, it becomes possible to offer the service to the plurality of clients simultaneously.

(19) Indication of Fees

In the present embodiment, the operating/managing system 500 has performed the charging of the new client introduction fee toward the SSP (the step 1222) and the charging of the fee in correspondence with the data migration amount toward the client that requested the migration between the SSPs (the step 1213). The chargings of these fees may be performed only by either of these methods. Also, the fees can be charged regardless of the data amount. Of course, it is also allowable to perform the fee chargings in correspondence with the fundamental fee and the fee in correspondence with the data migration amount.

(20) Inputting of Information on SSP 30a

In the present embodiment, it turns out that, when seen from the SSP 30a, the client has been taken away by the SSP 30b. Consequently, the SSP 30a is not necessarily willing to register the property information into the operating/managing system 500. In this case, even if, on the window 120 illustrated in FIG. 6 in the storage apparatus specifying unit 53, the client inputs the SSP name that the client uses at present, there are some cases where the property holding unit 56 holds none of the property information on the corresponding SSP. In this case, the client may provide the property holding unit 56 with the property information on the SSP 30a in use at present.

(21) Application of SSP 30b to Service

Also, the SSP 30b may operate the present operating/managing system 500. Namely, the SSP 30b requests the client to input the property information on the SSP that the client uses at present, and compares the property information with the property information on the SSP 30b, thereby indicating the superiority of the SSP 30b. Then, if the SSP 30b has succeeded in acquiring the client that uses the SSP 30a at present, the SSP 30b migrates the data stored in the SSP 30a over to the SSP 30b, using the operating/managing system 500 according to the present invention. Also, by executing the present migration processing as an initially introducing service by the SSP 30b, it becomes possible to prompt the switching over between the SSPs.

According to the present invention, the client that uses an SSP at present can compare a plurality of SSPs and select a needs-meeting SSP from among the SSPs, thereby being capable of completing the data migration from the one SSP to the other SSP without stopping the accesses to the SSPs. Also, the computer system is capable of implementing the data migration only by the setting switching of the network router and the setting switching of the computer to be performed after the completion of the data migration. The client that uses the computer system at present necessitates no special knowledge about the migration between the SSPs. Also, the setting switching of the network router and that of the computer to be performed after the completion of the data migration can also be performed from the operating/managing system.

When seen from the other SSP, the other SSP is capable of acquiring the new client via the operating/managing system according to the present invention.

It should be further understood by those skilled in the art that the foregoing description has been made on embodiments of the invention and that various changes and modifications may be made in the invention without departing from the spirit of the invention and the scope of the appended claims.

What is claimed is:

1. An operating/managing method in an operating/managing system of a plurality of storage apparatuses, comprising the steps of:

connecting at least two storage apparatuses of at least two storage service providers via at least two storage apparatuses connecting means of said operating/managing system with a computer of an user, wherein said at least two storage apparatuses include a storage apparatus in use at present, and said at least two storage apparatuses connecting means establish connections with said at least two storage apparatuses respectively;

causing a storage apparatus to be specified, the specified storage apparatus being said storage apparatus in use at present;

holding address information of an address of the specified storage apparatus in storage apparatus information holding means of said operating/managing system;

holding information concerning a property of each of said at least two storage apparatuses connected to said at least two storage apparatuses connecting means in property holding means of said operating/managing system;

causing a desired property to be specified from said computer for use in selecting a storage apparatus to be used next having a property that satisfies the desired property;

causing a particular storage apparatus to be selected from among candidates of storage apparatuses indicated from said operating/managing system by comparing the desired property to the property of each of said at least two storage apparatuses held in said holding means and selecting a storage apparatus having a property that satisfies the desired property as the storage apparatus to be used next;

holding address information of an address of the selected storage apparatus to be used next in said storage apparatus information holding means in addition to the address information of the address of said storage apparatus in use at present;

requesting the selected storage apparatus to create a volume; and instructing the selected storage apparatus to start duplication of data, wherein connection destination switching means of said operating/managing system creates a copy of data sent from the computer and changes a source address and a destination address of the copy of data to an address of a corresponding storage apparatus connecting means and the address of the selected storage apparatus to be used next respectively, thereby changing a path of communication between said computer and said storage apparatus in use at present to another path of communication between said computer and the selected storage apparatus to be used next, wherein said operating/managing system communicates with the selected storage apparatus and writes the copy of data into said selected storage apparatus, and wherein information duplicating means of said operating/managing system controls reading-out of data from said storage apparatus in use at present and writing-in of said data into said storage apparatus to be used next based on said address information held in said storage apparatus information holding means.

2. The operating/managing method of said storage apparatuses as claimed in claim 1, subsequent to said step of causing a particular storage apparatus to be selected, said operating/managing method further comprising a step of:

indicating a fee needed for duplication of said data, wherein said fee is calculated based on the volume allocated in said storage apparatus being in use at present.

3. The operating/managing method of said storage apparatuses as claimed in claim 1, wherein subsequent to said step of requesting said selected storage apparatus to create a volume, said operating/managing method further comprising a step of:

charging a fee to a user of a storage apparatus operating system that owns said selected storage apparatus.

* * * * *